(12) United States Patent
Pomar Garcia et al.

(10) Patent No.: US 9,764,419 B2
(45) Date of Patent: Sep. 19, 2017

(54) IGNITION DEVICE FOR EXOTHERMIC WELDING, MOLD FOR EXOTHERMIC WELDING FOR THE IGNITION DEVICE, AND APPARATUS FOR EXOTHERMIC WELDING COMPRISING SUCH A MOLD AND SUCH AN IGNITION DEVICE

(71) Applicant: APLICACIONES TECNOLOGICAS, S.A., Paterna (valencia) (ES)

(72) Inventors: Carlos Pomar Garcia, Paterna (ES); Veronica Pomar Pedredo, Paterna (ES)

(73) Assignee: APLICACIONES TECNOLOGICAS, S.A., Paterna (Valencia) (ES)

( * ) Notice: Subject to any disclaimer, the term of this patent is extended or adjusted under 35 U.S.C. 154(b) by 132 days.

(21) Appl. No.: 14/387,003

(22) PCT Filed: Mar. 19, 2013

(86) PCT No.: PCT/ES2013/070179
§ 371 (c)(1),
(2) Date: Sep. 22, 2014

(87) PCT Pub. No.: WO2013/140010
PCT Pub. Date: Sep. 26, 2013

(65) Prior Publication Data
US 2015/0041520 A1    Feb. 12, 2015

(30) Foreign Application Priority Data
Mar. 20, 2012 (ES) .................................. 201230412

(51) Int. Cl.
*B23K 31/00* (2006.01)
*B23K 31/02* (2006.01)
(Continued)

(52) U.S. Cl.
CPC .............. *B23K 23/00* (2013.01); *B23K 37/00* (2013.01); *B23K 37/04* (2013.01); *B23K 37/06* (2013.01); *F42B 3/10* (2013.01)

(58) Field of Classification Search
CPC ...................................................... B23K 23/00
(Continued)

(56) References Cited

U.S. PATENT DOCUMENTS 2,561,670 A    7/1945  Miller
3,086,465 A    4/1963  Montfort
(Continued)

FOREIGN PATENT DOCUMENTS

FR    2913358 A1    9/2008
GB    1549647       8/1979
(Continued)

OTHER PUBLICATIONS

International Search Report for corresponding application filed Mar. 19, 2013; Mail date Aug. 8, 2013.

*Primary Examiner* — Erin Saad
(74) *Attorney, Agent, or Firm* — Cantor Colburn LLP

(57) ABSTRACT

The present invention relates to an ignition device for exothermic welding comprising an electrically conductive metal bushing (1) that can house a pellet of a first welding material (4) in electrical contact with the inner wall of an inner chamber (1c) of the bushing (1), provided with an electrically insulating cap (2) and a bottom base (1b) with an opening (1d) through which the first welding material (4) falls in an incandescent state onto a second welding material (4a) arranged in a weld mold (7) when an exothermic reaction has been triggered in the first welding material (4); an electrode (5) that goes through the cap (2) of the metal bushing (1) and comprises a top contact (5a) connectable to a power output (24) of a voltage generator and a bottom (Continued)

contact in the form of a filament (5b) that can be in electrical contact with the pellet of the first welding material (4), the filament (5b) being made of a material having a melting temperature greater than the ignition temperature of the welding material (4); as well as a contact-assuring element (3) which is guided into the inner chamber (1c) between the bottom base (1b) and the pellet of the first welding material (4).

15 Claims, 6 Drawing Sheets

(51) Int. Cl.
- *B23K 20/00* (2006.01)
- *B23K 23/00* (2006.01)
- *F42B 3/10* (2006.01)
- *B23K 37/00* (2006.01)
- *B23K 37/04* (2006.01)
- *B23K 37/06* (2006.01)

(58) Field of Classification Search
USPC .................. 228/234.3, 198, 2.5; 266/167
See application file for complete search history.

(56) References Cited

U.S. PATENT DOCUMENTS

| | | | |
|---|---|---|---|
| 4,879,452 A * | 11/1989 | Kovarik | B23K 23/00 219/130.4 |
| 4,885,452 A | 12/1989 | Amos | |
| 5,259,644 A | 11/1993 | Albrecht | |
| 2007/0017955 A1 * | 1/2007 | Siracki | B23K 23/00 228/2.5 |
| 2009/0173873 A1 | 7/2009 | Stidham | |
| 2009/0188969 A1 | 7/2009 | Siracki | |
| 2011/0132967 A1 | 6/2011 | Lofton | |
| 2011/0198391 A1 | 8/2011 | Stidham | |
| 2012/0055979 A1 | 3/2012 | Alghusain | |

FOREIGN PATENT DOCUMENTS

| | | |
|---|---|---|
| JP | 7251276 A | 3/1995 |
| WO | 03064095 A2 | 8/2003 |

* cited by examiner

IGNITION DEVICE FOR EXOTHERMIC WELDING, MOLD FOR EXOTHERMIC WELDING FOR THE IGNITION DEVICE, AND APPARATUS FOR EXOTHERMIC WELDING COMPRISING SUCH A MOLD AND SUCH AN IGNITION DEVICE

TECHNICAL FIELD OF THE INVENTION

The present invention is comprised in the technical field of systems used for exothermic welding used, for example, for welding conductors such as strips and cables, such as those used in installations for protecting against rays and ground connections.

BACKGROUND OF THE INVENTION

Exothermic welding, particularly copper-based aluminothermic welding, is based on reducing copper oxide by metallic aluminum. The reaction is highly exothermic, releasing a large amount of heat, being able to reach temperatures greater than 1000° C. These conditions allow melting the materials to be welded, being joined together by the result of the heat generated by the exothermic reaction.

Although the reaction is chemically aluminothermic, it is known as exothermic welding, conventionally being produced by means of an initiating reactant providing enough energy to activate the process, which takes place rapidly and safely inside a mold, preferably a graphite mold, designed specifically for each element and type of welding, such as, for example, for welding conductors arranged in a T-shape, linearly, in parallel, etc.

There are many advantages involved with exothermic welding since it is a process that results in molecular and not only mechanical bonding of the materials to be welded, assuring the connections not only between copper cables, but also for welding metal strips and parts made of brass, stainless steel, copper clad steel ground rods, etc. In these conditions, welds thus formed have a higher electrical conductivity than that of the conductors themselves, they do not corrode, rust or degrade over time, are resistant to galvanic coupling, able to withstand repeated electrical discharges, the resistance thereof never increases, they are mechanically resistant and more pressure resistant than the conductors themselves, and offer a low resistance connection that is particularly important for achieving a long-lasting and reliable result in forming any ground connection.

The welding material used in exothermic welding is usually a mixture of copper and aluminum powder oxides and metallic alloy-forming elements that are compatible with the elements to be welded. Although the reaction of the welding material does not occur spontaneously, once it is initiated the process is triggered in its entirety without a major energy supply, and molten copper and slag are obtained.

To supply the energy necessary for triggering the exothermic reaction, an initiating reactant powder (initiating material) was conventionally used, said initiating reactant powder having a composition similar to the welding material but somewhat different, especially the aluminum used, which is finer and more reactive, which requires a minimal energy source to react and then transfer to the welding material the energy necessary to initiate the reaction between the metal oxide and the aluminum present in the main reaction. A known sequence for conventional exothermic welding applied to a weld between conductors comprises the following steps:

1. Placing the conductors to be welded in the mold once they are clean and dry.
2. Closing the mold to prevent material leakage and placing a support plate to contain the welding material before the reaction.
3. Pouring the welding material.
4. Pouring the initiating reactant such that about 50% is scattered over the surface left by the welding material whereas the other half is poured in the form of a fuse from the edge of the mold to the welding material for the purpose of facilitating ignition
5. Igniting with a lighter or pistol spark lighter providing enough energy to produce the reaction of the initiating reactant.
6. The energy produced by this reactant triggers the main reaction which is maintained until all the welding material has reacted, melting the support plate, producing molten copper that falls to where the conductors are housed, causing molecular bonding by exothermic welding and the conductors fusing to one another.
7. After waiting a few seconds for the sake of safety, the mold is opened and the weld is obtained, and the mold is cleaned to form, where appropriate, a new connection.

Conventional methods for exothermic reactions have some drawbacks that were desired to be reduced or eliminated. Therefore, the support plate and the poured welding material powder can present a problem depending on the use conditions or when the mold is deteriorated and the hopper shoot widens. This disrupts plate stability and the welding material passes as powder into the welding chamber, where its reaction will produce slag that does not separate from the molten copper. Furthermore, the suitable arrangement of the initiating material and of the welding material in the crucible hopper or weld mold hopper requires relatively extensive preparation time.

The problems in using and transporting the initiating reactant also make the elimination thereof advisable since environmental conditions (air, temperature, humidity) affect the ease of ignition thereof, whereas due to its chemical characteristics, transport thereof is restricted in some cases and according to importing countries. In the proposed invention, this aforementioned initiating reactant powder (initiating material) is further replaced with a first welding material in a new compact pellet format and with preferred characterizing physicochemical parameters that eliminate the drawback discussed, optimally facilitating and assuring the exothermic reaction with a second welding material mainly in those cases in which said second welding material is also in the form of a solid pellet. Such pellets have the advantage of maintaining the concentration of the entire stationary volume of the reactants preventing problems relating to concentration differences caused by different molecular weights of the components of the welding material.

The attempt has been made to include a container made entirely or partially of a fungible material as a reaction receptacle placed in the weld mold crucible or hopper to overcome one of the drawbacks indicated above. This container containing the welding material powder incorporates an ignition system that eliminates the use of a powder initiator. Therefore, EP1472037 describes an igniter comprising a container having side walls with only the bottom portion thereof being fusible, an exothermic welding material within the container, an igniter extending into the container for igniting the exothermic material and a cover or cap attached to the container sealing the top opening to thereby prevent ingress of contaminants into the welding material, characterized by a refractory material lining the sides walls of the container, wherein the refractory material is a graphite film (foil) which is a separate liner inserted within the side walls of the container, and wherein said side walls of the container have a conical shape and include metal.

Containers of the type described above and the corresponding ignition systems can cause unwanted combustions and residues in the slag or even in the final weld and considerably increase the volume of the product since the container has the same shape as the hopper. The slag that is generated also increases because if the container is not consumed it becomes a residue, and if it is consumed it becomes part of the weld with the composition problems of the molten material which should make the initial mixture change, entailing an additional problem. In turn, if the container is not shaken, over time the heavier components of the mixture could accumulate on the bottom portion of the container, which leads to variations in the partial composition of the welding material affecting the main reaction.

Given its very nature, exothermic welding generates very high temperatures accompanied by a huge release of energy, which can sometimes cause the high-temperature molten material and/or slag to splash out of the weld mold. This presents an occupational hazard inherent to the welding process itself, so the remote detonation or ignition of said process greatly reduces the risks of burns in operators and technicians doing the welding.

DESCRIPTION OF THE INVENTION

The object of the present invention is to overcome the drawbacks of the state of the art described above by means of an ignition device for exothermic welding, a mold for exothermic welding for the ignition device, and an apparatus for exothermic welding comprising the mold and the device.

The ignition device for exothermic welding comprises a metal container at least partially housable in a weld mold, the metal container comprising a top base closed by a cap, a bottom base and an inner chamber for housing a first welding material having an ignition temperature, and ignition means for initiating and triggering a first exothermic reaction in said first welding material intended for subsequently triggering a second exothermic reaction in a second welding material, in which the metal container is an electrically conductive metal bushing contemplated as being connectable to a first pole of a power output of a voltage generator;

the cap of the metal bushing is made of an electrically insulating material that preferably does not deform with heat, such as DM for example:

the bottom base of the metal bushing has an opening through which the first welding initiating material falls in an incandescent state towards a second welding material housed in the weld mold when the exothermic reaction has been triggered, triggering a second exothermic reaction in the second welding material;

the inner chamber of the metal container comprises an inner wall sized for housing the first welding material in the form of a solid pellet and suitable for placing the pellet of the first welding material in electrical contact with the inner wall of the inner chamber. The inner perimeter of said inner wall is preferably complementary to the outer perimeter of the pellet of the first welding material;

the ignition means comprise an electrode that goes through the cap of the metal bushing and comprises a top contact connectable to a second pole of the power output of the voltage generator, preferably made of brass or a tin-plated material, and a bottom contact in the form of a filament that can be in electrical contact with the pellet of the first welding material, the top and bottom contacts being able to be connected by a connecting sector from which the filament emerges;

the filament is made of a material having a melting temperature greater than the ignition temperature of the first welding material, and the possibility that the filament itself is connectable to the second pole of the power output of the voltage generator is contemplated;

an assuring element is supported on the bottom base of the metal bushing in the inner perimeter of the inner chamber and under the pellet of the first welding material when said pellet is housed in the inner chamber of the metal bushing before the exothermic reaction to assure that the pellet optimally contacts the filament.

The assuring element can be made of a material that partially or completely melts due to the exothermic reaction, and it can be a coil spring which is guided into the inner chamber of the metal bushing and compressed by the pellet of the first welding material, released when said pellet gradually falls in an incandescent state towards the bottom base of the weld mold through the preferably central opening on the bottom base of the metal bushing.

When current intensity sufficient to induce incandescence and melt the filament of the electrode is applied to this ignition device, the filament reaches a temperature greater than the ignition temperature necessary for triggering the first exothermic reaction in the pellet of the first welding material, it reacts and falls onto the second welding material provoking its ignition. The resulting molten material falls and forms the connections on a molecular level with the materials to be welded. When melting the filament, electric flux between the electrode and the metal bushing is cut off.

In general terms, the first welding material in the form of a pellet has the function of being the initiating material for initiating the reaction of the second welding material which can be in the form of powder or preferably in the form of a pellet.

In this last case in which both materials are two pellets and given the solely initiating functions of the first welding material, the dimensions of the first welding material can be smaller than those of the second welding material, but large enough so that once it is melted it allows the reaction of the second welding material. If the first welding material was not present and given the size difference between both pellets, the filament would not be able to melt the pellet corresponding to the second welding material.

To that end, the pellets of the first and second welding materials preferably have the same composition in terms of their essential components as conventional welding materials but in different proportions such that in order for the ideal compaction of one or both welding materials to be functional, preferably the reactive metal oxide must be obtained from a starting metal powder, such as copper for example, more particularly electrolytic copper having preferred physicochemical characteristics with a particle size or grain size distribution not greater than 1000 microns, apparent density comprised between 1.25 and 1.9 $g/cm^3$ and purity not less than 99.5%. Once this oxide is obtained it comprises 40-60% of the final mixture of the welding material.

In addition to said oxide, amounts of the starting metal having characteristics similar to those described are preferably provided, making up no more than 20-25% of the total composition.

The remaining materials of the reaction and alloy-forming elements preferably do not exceed 1 mm in diameter, whereas the flux particle size must be adapted to the starting metal particle size, not exceeding 10% by weight of the final mixture.

They can be manufactured by means of known methods, for example, by means of compressing and shaping the powder of the components of the welding material, which has been previously homogenized, eventually adding binders that do not negatively affect the exothermic reaction. Such pellets have the advantage of maintaining the concentration of entire stationary volume of the reactants, preventing problems relating to concentration differences caused by different molecular weights of the components of the welding material.

The material of the filament can be selected from group 6 transition metals, alloys thereof and alloys of at least one transition metal with at least another element that is not a transition metal. The material of the filament is preferably a material having a melting temperature between 2,500° C. and 4,000° C., and more preferably a melting temperature of 3,500° C.±200° C. Particularly, the material of the filament can be selected from tungsten and alloys comprising tungsten, among them preferably tungsten-copper, to provide the filament with certain flexibility. The filament is preferably made of a material that reaches its melting temperature when a current between 4 and 10 amperes is applied thereto, preferably in less than 10 seconds. The connecting sector of the electrode can comprise a blind hole in which an upper portion of the bottom contact is assembled.

The metal bushing can be cylindrical, the inner chamber ring-shaped and the opening of the metal bushing circular. The preferred arrangement of the metal bushing will be at least partially in the weld mold, said mold having its own cap or an independent cap having means for being adapted to the upper opening of the mold. The top base of the metal bushing comprises a perimetral support flange.

The metal bushing with its components can be manufactured, among others, in aluminum, copper or a combination thereof or even as an at least partially fungible container like a cartridge preloaded with a pellet of the first welding material comprising a minimum amount of the first welding material necessary for initiating the process of the first exothermic reaction, which falls in a molten state in the form of a droplet onto the second welding material, which forms the actual exothermic weld with the materials to be welded, when the reaction is provoked.

According to the invention, the mold for exothermic welding comprises a top housing for at least partially housing a metal container of an ignition device for exothermic welding containing a first welding material, a bottom housing for housing a second welding material and connected with the top housing for receiving the first welding material in an incandescent state after the ignition device has triggered a first exothermic reaction such that the first incandescent welding material triggers a second exothermic reaction in the second welding material;

a bottom welding area designed for providing conductors to be welded by means of exothermic welding;

a bottom vertical passage connecting the bottom housing with the welding area to allow the welding material melted by the second exothermic reaction to fall onto the conductors to be welded;

it having been envisaged that the top housing is designed for at least partially housing the metal container of the ignition device for exothermic welding comprising the features of the ignition device described above.

In a preferred embodiment, the bottom housing of the mold is designed for housing the second welding material also in the form of a solid pellet but having dimensions that are greater than the pellet of the first welding material. In this case, the bottom housing can comprise a bottom ring-shaped base on which the solid pellet of the second welding material is supported and comprising a preferably central opening into which the bottom vertical passage opens towards the bottom housing. Preferably, the mold also comprises an electrically conductive top cap which is designed for surrounding and contacting the metal bushing of the ignition device and is connectable to the first pole of the power output of the voltage generator.

The apparatus for exothermic welding according to the invention comprises the ignition device and the mold according to the invention, as well as ignition means intended for applying the electric power necessary for triggering the first exothermic reaction. The ignition means can comprise a remote electronic ignition device integrating the voltage generator with the power output connectable by said first pole to the metal bushing by means of a first conductor cable and to the top contact of the electrode by means of a second conductor cable, the electronic voltage device being capable of supplying sufficient current intensity for a sufficient time to melt the filament. Such electronic ignition device can comprise a battery having a rated voltage of 3 to 12V, preferably 6V, with a negative contact connectable to the first pole of the power output of the voltage generator and a positive contact connected to the second pole of the power output and a resistor interconnected between the positive contact of the battery and said second pole of the power output, as well as a charging device connectable to an external power source, and a relay interconnected between the positive contact of the battery, the resistor and the charging device, for selectively connecting the positive contact of the battery to the charging device (for charging the battery) or to the second pole of the power output for supplying power to the filament. This electronic ignition device also comprises a microcontroller connected to the positive contact of the battery, to the charging device and to the relay for controlling the charge of the battery and the power leaving through the power output. This microcontroller further comprises a timer for maintaining the power supply to the power output for a sufficient supply time to successfully melt the filament and trigger the exothermic reaction in the first welding material.

Preferably, the electronic ignition device also comprises an on/off button connected to the positive contact of the battery and to the microcontroller for selectively switching the electronic ignition device on and off, as well as at least one activating button connected to the positive contact of the battery and to the microcontroller for selectively activating the power supply to the power output. Two activating buttons connected in parallel that activate the power supply to the power output only when they are pressed simultaneously can be provided.

To provide information about the operating state of the electronic ignition device, said device can be provided with one or more indicator lights selected from a wait indicator light connected to the microcontroller that lights up when the electronic ignition device is switched on, an activation indicator light connected to the microcontroller that lights up when the power supply to the power output is activated, a charge indicator light connected to the charging device that lights up when the charging device is charging the battery, and a state of charge indicator light connected to the microcontroller that lights up when the microcontroller detects that the charge of the battery is below a predetermined charge threshold. Preferably, the indicator lights are light-emitting diodes (LEDs).

To prevent or at least reduce risks for the person who is welding, the electronic ignition device preferably comprises at least one warning alarm, selected from light alarms, sound alarms and combinations thereof, connected to the microcontroller, which is activated when the power supply to the power output is initiated and remains activated at least until the exothermic reaction of the first welding material has ended. The microcontroller can be programmed to keep the warning alarm activated for a safe time period after the end of the first exothermic reaction and, optionally, also after the end of the second exothermic reaction, corresponding to a cooling time that the mold requires until being cooled to a safe temperature that does not involve the risk of injury for a person that gets close to the weld mold. The microcontroller can alternatively or complimentarily be programmed to keep the warning alarm activated until a temperature sensor detects a safe mold temperature after the end of the exothermic reactions that does not involve the risk of injury for a person that gets close to the mold.

As can be inferred from above, the present invention overcomes the drawbacks of the systems for exothermic welding processes in an effective, safe and simple manner.

BRIEF DESCRIPTION OF THE DRAWINGS

Aspects and embodiments of the invention are described below based on the schematic drawings, in which.

Figure 1:
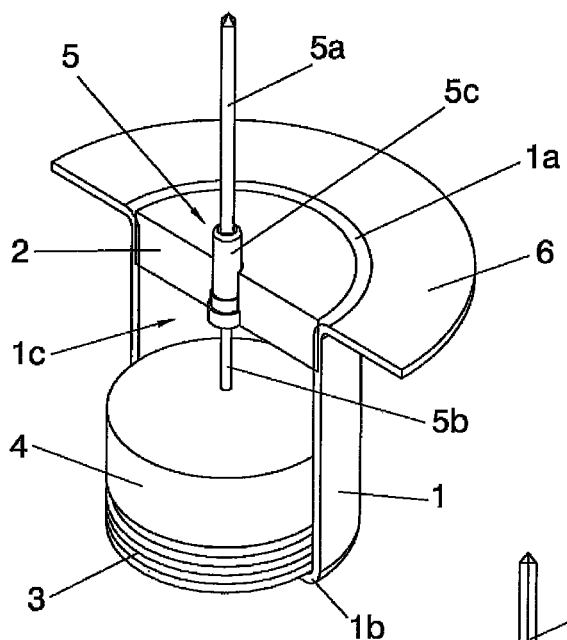
FIG. 1 is a partially sectioned top perspective view of an embodiment of an ignition device according to the present invention.
Figure 2:
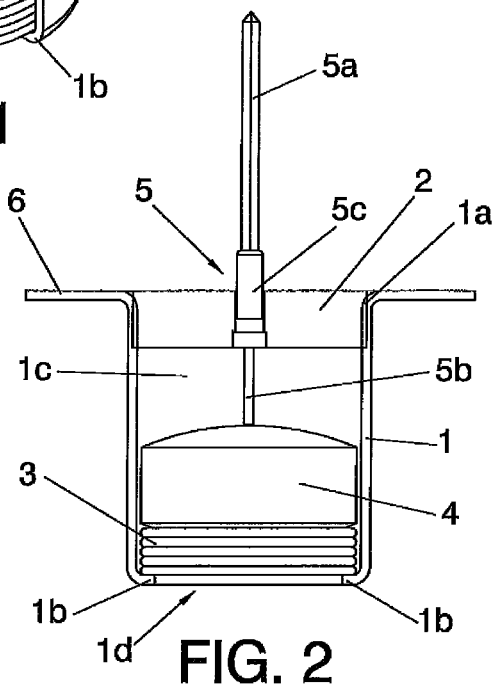
FIG. 2 is an also partially sectioned side elevational view of the ignition device shown in FIG. 1.
Figure 3:
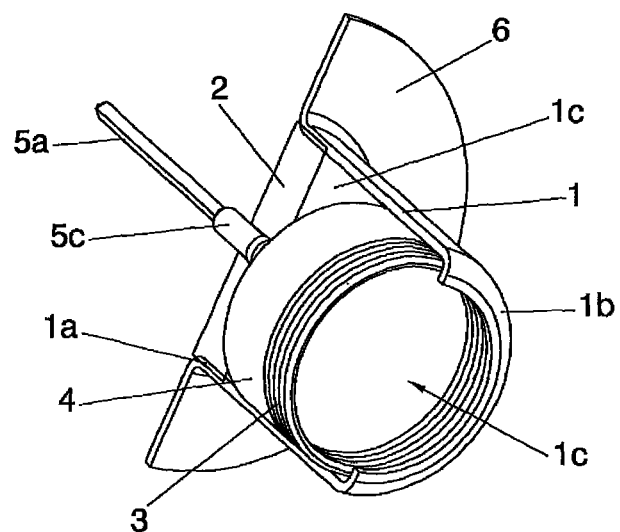
FIG. 3 is a partially sectioned bottom perspective view of the ignition device shown in FIGS. 1 and 2.
Figure 4:
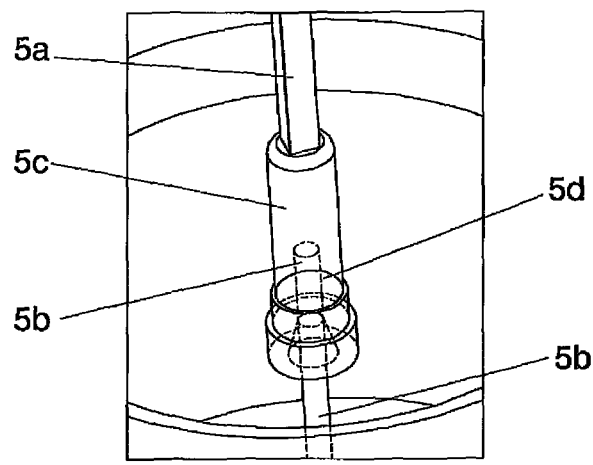
FIG. 4 is a detailed view of an embodiment of the electrode comprised in the ignition device shown in FIGS. 1 to 4.

Reference numbers identifying the following elements can be seen in these figures:

1 metal bushing
1a top base of the metal bushing
1b bottom base of the metal bushing
1c inner chamber
1d opening of the bushing
2 cap of the bushing
3 coil spring
4 first welding material (initiator)
4a second welding material
5 electrode
5a top contact
5b bottom contact in the form of a filament
5c connecting sector
5d blind hole
6 perimetral support flange
7 weld mold
7b bottom base
7c top housing area
7d bottom housing
7e welding area
7f bottom vertical passage
7g bottom ring-shaped support base
7h opening of the mold
7i insertion area
8 connector for the cap
8a clamp for the electrode
9a first conductor cable
9b second conductor cable
10 remote electronic ignition device
11 resistor
12 charging device
13 external power source
14 external power connector
15 wait indicator light
16 state of charge indicator light
17 charge indicator light
18 activation indicator light
19 warning alarm
20 on/off button
21a, 21b activating buttons
22 microcontroller
23 relay
24 power output
24a first pole of the power output
24b second pole of the power output
25 battery
25a positive contact
25b negative contact
26 conductors to be welded
27 top cap Embodiments Of The Invention In the embodiment shown in FIGS. 1 to 4, the ignition device comprises a cylindrical electrically conductive metal bushing —1— comprising a top base —1a— with a perimetral flange —6— closed by a cap —2— made of an electrically insulating material, a bottom base —1b— and an internal ring-shaped chamber —1c— in which the first welding material —4— in the form of a solid or compacted pellet is housed. The bottom base —1b— of the metal bushing —1— has a central circular opening —1d— through which the first welding material —4— can fall in an incandescent state towards the weld mold —7— when the first exothermic reaction has been triggered.

The inner chamber —1c— comprises an inner wall sized for housing the first welding material —4— in the form of a solid pellet and with an inner perimeter complementary to the outer perimeter of the pellet of the welding material —4— for placing the pellet of the welding material —4— in electrical contact with the inner wall of the inner chamber —1c—.

Figure 5:
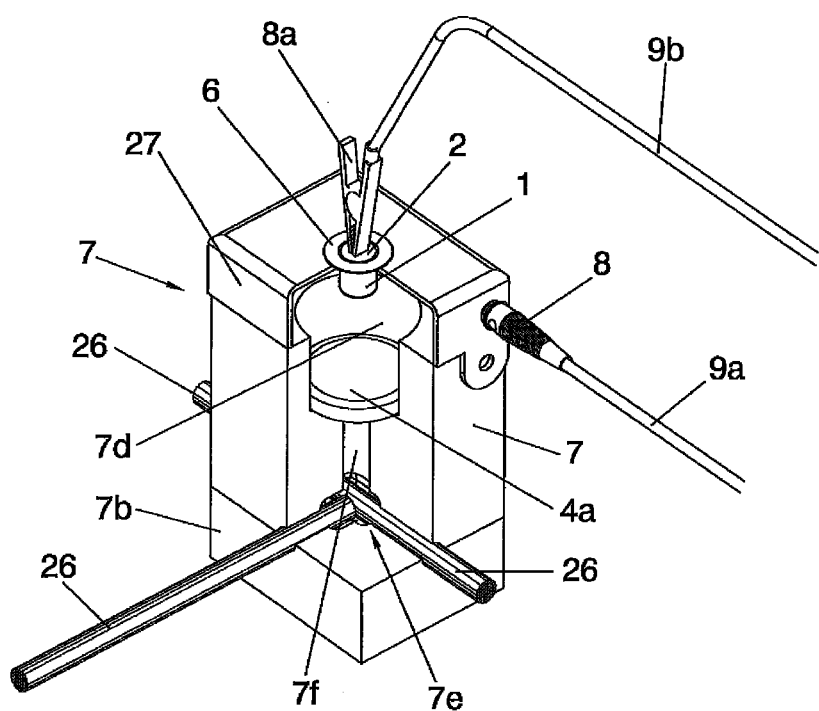
FIG. 5 is a partially sectioned top perspective view of an embodiment of the weld mold according to the invention.
Figure 6:
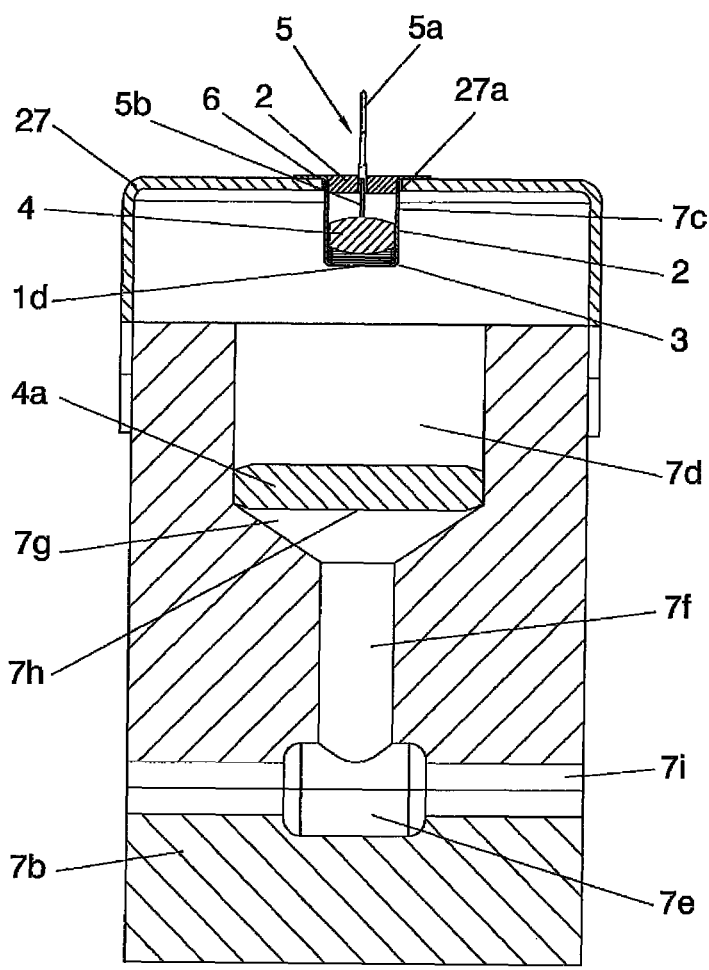
FIG. 6 is a sectioned side elevational view of the weld mold shown in FIG. 5.

A coil spring —3— is supported on the bottom base —1b— of the metal bushing —1—, said coil spring being guided into the inner perimeter of the inner chamber —1c— and compressed by the pellet of the first welding material —4— housed in the inner chamber —1c— of the metal bushing —1— before the exothermic reaction. The coil spring —3— is released when the first welding material —4— gradually falls in an incandescent state vertically through the passage defined by the coils of the coil spring towards the second welding material —4a— (FIGS. 5, 6)

through the opening —1d— of the bottom base —1b— of the metal bushing —1—, and when it is released it expands upwardly scraping the inner wall of the inner chamber —1c— of the metal bushing —1—.

The ignition device further comprises ignition means comprising an electrode —5— that goes through the cap —2— of the metal bushing —1— and comprises a top contact —5a— and a bottom contact in the form of a filament —5b— which is in electrical contact with the pellet of the welding material —4—. The top contact —5a— and the filament —5b— are connected by a connecting sector —5c— from which the filament —5b— which is assembled in a blind hole —5d— of the connecting sector —5c— emerges.

The filament —5b— is made of a material having a melting temperature greater than the ignition temperature of the welding material —4—, such as tungsten, for example, which has a melting temperature of 3422° C. and reaches that melting temperature when a current between 4 and 10 amperes is applied thereto for at least 2 to 5 seconds.

The mold —7— for welds illustrated in FIGS. 5 and 6 comprises a parallelepiped body with a top cap —27— made of an electrically conductive material, as well as a bottom base —7b—. The top cap —27— comprises a central and cylindrical upper opening (not depicted) through which the metal bushing —1— of the ignition device described above in reference to FIGS. 1 to 4 is inserted, such that the metal bushing —1— is at least partially located in the housing area —7c— of the mold, with the perimetral flange —6— on the actual cap —27— of the mold. A pellet of the first welding material —4— is arranged inside the metal bushing —1—.

A bottom housing —7d— for housing a pellet of a second welding material —4a— is located below the top housing area —7c— of the mold, said bottom housing —7d— communicated with the top housing —7c— for receiving the first welding material —4— in an incandescent state after the ignition device has triggered the first exothermic reaction, such that the first incandescent welding material —4— triggers a second exothermic reaction in the second welding material —4a—. The bottom housing —7d— is designed for housing the second welding material —4a— in the form of a solid pellet having dimensions that are greater than the pellet of the first welding material —4— and comprises a bottom ring-shaped base —7g— supporting the solid pellet of the second welding material —4a— and comprising an opening —7h— into which a bottom vertical passage —7f— opens towards the bottom housing —7d—. The bottom vertical passage —7f— communicates the bottom housing with a welding area —26e— to allow the welding material —4, 4a— melted by the second exothermic reaction to fall onto a bottom welding area —7e— on the area of attachment where the conductors to be welded —26— must be welded by means of exothermic welding. The conductors to be welded —26— are immobilized in a conventional manner in an insertion area —7i— located above the bottom base —7b— of the mold —7—.

Figure 7:
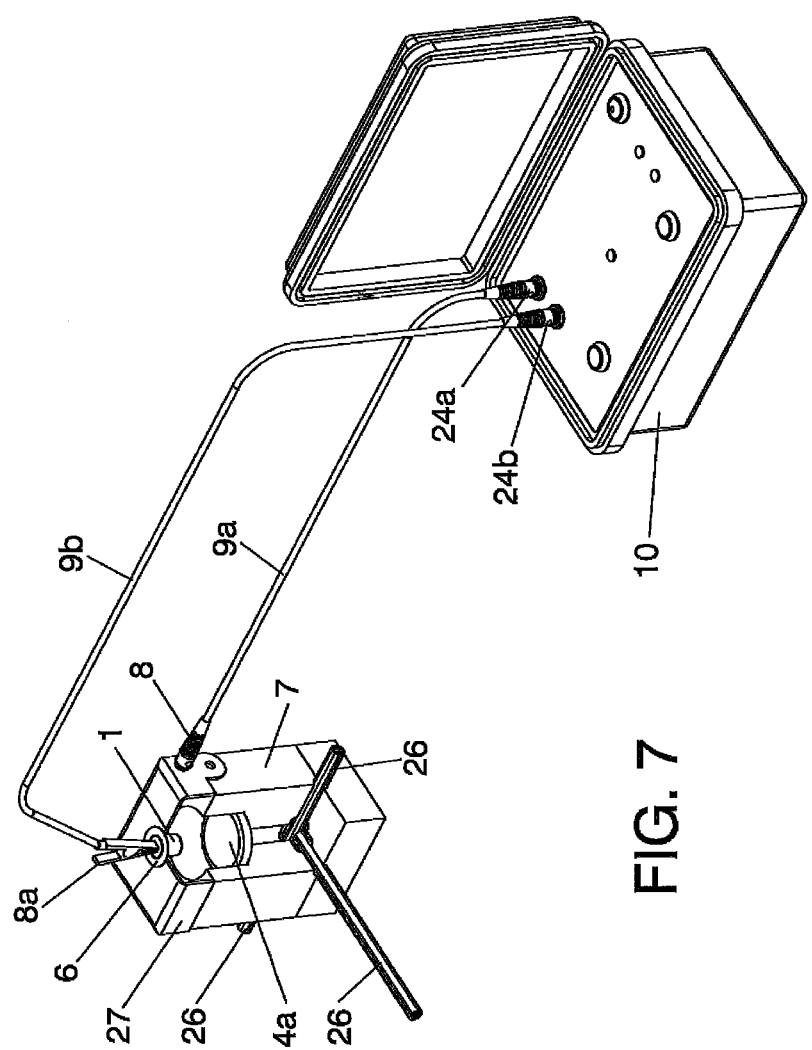
FIG. 7 is a view of an embodiment of the apparatus according to the present invention incorporating the ignition device shown in FIGS. 1 to 4 and the weld mold shown in FIGS. 5 and 6.

The electrically conductive top cap —27— surrounds and contacts the metal bushing —1— of the ignition device, and is provided with a connector —8— connected through a first conductor cable —9a— to a first pole —24a— of a power output —24— of a remote electronic ignition device —10— integrating a voltage generator (FIG. 7). In turn, the top contact —5a— of the electrode —5— is connected to a second pole —24b— of the power output —24— of the electronic ignition device —10— by means of a clamp —8a— and a second conductor cable —9b— (FIG. 7). The electronic voltage device —10— is capable of supplying enough power to melt the filament —5b—, such as a current of 4 to 10 A for at least 2 to 5 seconds for example.

Figure 8:
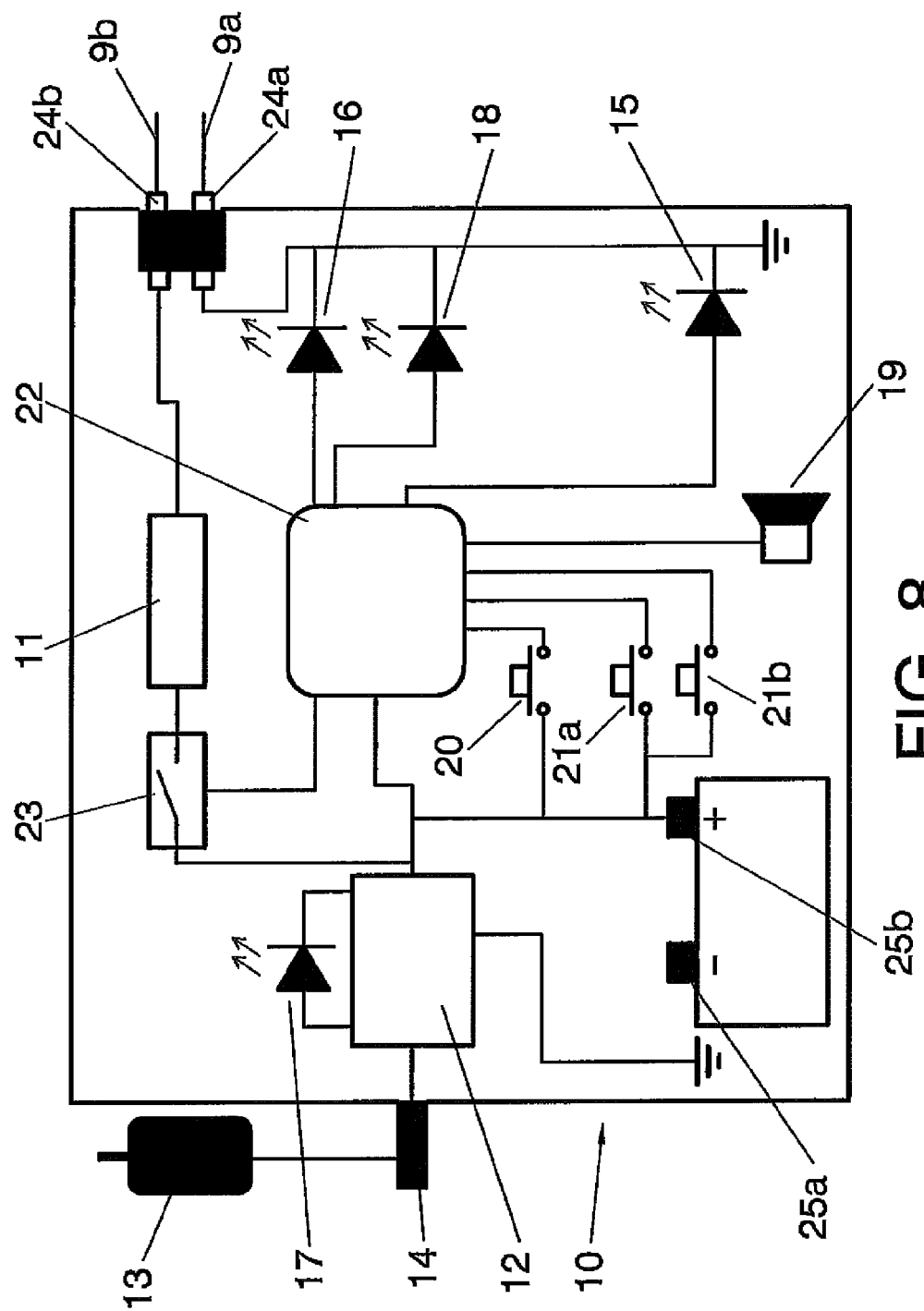
FIG. 8 is a wiring diagram of an embodiment of the remote electronic ignition device.

FIG. 8 shows an embodiment of the electronic ignition device —10— in which said device comprises a battery —25—, such as a 6V battery for example, a charging device —12— connectable to an external power source —13— through an external power connector —14—; a relay —23—, a resistor 11— and a microcontroller —22—, integrated in a casing. The battery —25— has a negative contact —25a— connectable to the first pole —24a— and a positive contact —25b— connected to the second pole —24b— of the power output —24—. The resistor —11— is interconnected between the positive contact —25b— and said second pole —24b—. whereas the relay —23— is interconnected between the positive contact —25b— of the battery —25—, the resistor —11— and the charging device —12—, for selectively connecting the positive contact —25b— of the battery —25— to the charging device —12— for charging the battery —25—, or to the second pole —24b— of the power output —24— for supplying power to the filament —5b—. In turn, the microcontroller —22— is connected to the positive contact —25b— of the battery —25—, to the charging device —12— and to the relay —23— for controlling the charge of the battery —25— and the power leaving through the power output —24—. The microcontroller —22— also comprises a timer for maintaining the power supply to the power output —24— for a sufficient supply time to successfully melt the filament —5b— and trigger the exothermic reaction in the welding material —4—.

The electronic ignition device —10— further comprises an on/off button —20— connected to the positive contact —25b— of the battery —25— and to the microcontroller —22— for selectively switching the electronic ignition device on and off, as well as two activating buttons —21a, 21b— connected in parallel between the positive contact —25b— of the battery —25— and the microcontroller —22— for selectively activating the power supply to the power output —24— when they are pressed simultaneously. The electronic ignition device —10— additionally comprises a wait indicator light —15— connected to the microcontroller —22— that lights up when the electronic ignition device —10— is switched on;

an activation indicator light —18— connected to the microcontroller —22— that lights up when the power supply to the power output —24— is activated;

a charge indicator light —17— connected to the charging device —12— that lights up when the charging device —12— is charging the battery —25-; and a state of charge indicator light —16— connected to the microcontroller —22— that lights up when the microcontroller —22— detects that the charge of the battery —25— is below a predetermined charge threshold.

These indicator lights are preferably light-emitting diodes (LEDs) emitting light of different colors.

The electronic ignition device —10— also comprises an acoustic warning alarm —19— connected to the microcontroller —22— which is activated when the power supply to the power output —24— is initiated and remains activated at least until the exothermic reaction of the welding material —4— has ended and for a safe time period after the end of the exothermic reaction, corresponding to a cooling time that the mold requires until it has dropped to a safe temperature that does not involve the risk of injury for a person that gets close to the mold, for which purpose the microcontroller —22— can have a timer and/or a temperature sensor detecting a safe mold temperature after the end of the exothermic reaction that does not involve the risk of injury for a person that gets close to the mold.

The invention claimed is:

1. Ignition device for exothermic welding comprising a metal container at least partially housable in a weld mold, the metal container comprising a top base closed by a cap, a bottom base and an inner chamber for housing a first welding material having an ignition temperature, and ignition means for triggering a first exothermic reaction in the first welding material intended for triggering a second exothermic reaction in a second welding material housed in the weld mold, wherein
   the metal container is an electrically conductive metal bushing housable in an electrically conductive top cap of the weld mold, which is designed for surrounding and contacting the metal bushing of the ignition device and which is connectable to a first pole of a power output of a voltage generator;
   the cap of the metal bushing is made of an electrically insulating material;
   the bottom base of the metal bushing has an opening through which the first welding material falls in an incandescent state towards the second welding material housed in the weld mold when the first exothermic reaction has been triggered;
   the inner chamber comprises an inner wall sized for housing the first welding material in the form of a solid pellet and suitable for placing the pellet of the first welding material in electrical contact with the inner wall of the inner chamber;
   the ignition means comprise an electrode that goes through the cap of the metal bushing and comprises a top contact connectable to a second pole of the power output of the voltage generator, and a bottom contact in the form of a filament that can be in electrical contact with the pellet of the first welding material;
   the filament is made of a material having a melting temperature greater than the ignition temperature of the first welding material;
   a contact-assuring element assuring electrical contact of the pellet of the first welding material with the filament is supported on the bottom base of the metal bushing, wherein
   the electrical contact-assuring element comprises a coil spring which is guided along an inner perimeter of the inner chamber and compressed by the pellet of the welding material when said pellet is housed in the inner chamber of the metal bushing before the exothermic reaction and released when the welding material gradually falls in an incandescent state towards the weld mold through the opening of the bottom base of the metal bushing.

2. Ignition device according to claim 1, wherein the second welding material is in the form of a solid pellet.

3. Ignition device according to claim 1, wherein the composition of the first and/or second welding material comprises between 40-60% of a reactive metal oxide obtained from a metal powder with a grain size distribution not greater than 1000 microns, apparent density comprised between 1.25 and 1.9 g/cm$^3$ and a purity not less than 99.5%, suitable for compaction.

4. Ignition device according to claim 3, wherein the metal powder is copper or electrolytic copper.

5. Ignition device according to claim 3, wherein the reactive metal oxide additionally comprises an amount of the metal powder that does not exceed 20-25% of the total composition of the first and/or second welding material.

6. Ignition device according to claim 3, wherein the composition of the first and/or second welding material comprises materials suitable for provoking the reaction and alloy-forming elements which do not exceed 1 mm in diameter and a flux the particle size of which must be suited to that of the metal powder, the flux not exceeding 10% by weight of the final mixture.

7. Ignition device according to claim 1, wherein the metal bushing is cylindrical.

8. Ignition device according to claim 1, wherein the inner chamber is ring-shaped.

9. Ignition device according to claim 1, wherein the top base of the metal bushing comprises a perimetral support flange.

10. Ignition device according to claim 1, wherein the material of the filament is selected from group 6 transition metals, alloys thereof and alloys of at least one transition metal with at least another element that is not a transition metal.

11. Ignition device according to claim 1, wherein the material of the filament is a material having a melting temperature between 2,500° C. and 4,000° C.

12. Ignition device according to claim 1, wherein the filament is made of a material that reaches its melting temperature when a current between 4 and 10 amperes is applied thereto.

13. Apparatus for exothermic welding comprising an ignition device according to claim 1 and a mold, wherein the mold comprises:
   a top housing area for at least partially housing a metal container of an ignition device for exothermic welding containing a first welding material,
   a bottom housing for housing a second welding material and connected with the top housing area for receiving the first welding material in an incandescent state after the ignition device has triggered a first exothermic reaction such that the first incandescent welding material triggers a second exothermic reaction when it falls onto the second welding material;
   a bottom welding area designed for providing conductors to be welded by means of exothermic welding;
   a bottom vertical passage connecting the bottom housing with the welding area (26e) to allow the welding material melted by the second exothermic reaction to fall onto the conductors to be welded;
   wherein the top housing area being designed for at least partially housing the metal container of the ignition device.

14. Apparatus for exothermic welding according to claim 13, wherein it comprising an electrically conductive top cap which is designed for surrounding and contacting the metal bushing of the ignition device and which is connectable to the first pole of the power output of the voltage generator.

15. Apparatus for exothermic welding according to claim 14 furthermore comprising
   a remote electronic ignition device integrating the voltage generator with the power output connectable by said first pole to the metal bushing through the electrically conductive top cap of the weld mold by means of a first conductor cable and to the top contact of the electrode by means of a second conductor cable, the electronic ignition device being designed for being able to supply sufficient current intensity for a sufficient time to melt the filament of the ignition device.

* * * * *